(12) United States Patent  
Sekiya et al.

(10) Patent No.: US 8,892,889 B2  
(45) Date of Patent: Nov. 18, 2014

(54) INFORMATION PROCESSING APPARATUS, PROGRAM, STORAGE MEDIUM AND INFORMATION PROCESSING SYSTEM

(75) Inventors: Shuichi Sekiya, Saitama (JP); Naofumi Hanaki, Kanagawa (JP); Keitarou Watanabe, Tokyo (JP); Shinichi Kato, Tokyo (JP); Itsuki Kamino, Kanagawa (JP)

(73) Assignee: FeliCa Networks, Inc., Tokyo (JP)

( * ) Notice: Subject to any disclaimer, the term of this patent is extended or adjusted under 35 U.S.C. 154(b) by 333 days.

(21) Appl. No.: 12/835,022

(22) Filed: Jul. 13, 2010

(65) Prior Publication Data

US 2011/0029779 A1    Feb. 3, 2011

(30) Foreign Application Priority Data

Jul. 29, 2009  (JP) ................. P2009-176574

(51) Int. Cl.  
*G06F 21/34* (2013.01)  
*G06F 21/72* (2013.01)  
*H04L 9/32* (2006.01)

(52) U.S. Cl.  
CPC .............. *H04L 9/3247* (2013.01); *G06F 21/72* (2013.01); *H04L 2209/80* (2013.01); *G06F 2221/2141* (2013.01); *H04L 2209/60* (2013.01)  
USPC ............................................. 713/170; 726/9

(58) Field of Classification Search  
USPC ............................................. 713/170; 726/9  
See application file for complete search history.

(56) References Cited

U.S. PATENT DOCUMENTS

| | | | | |
|---|---|---|---|---|
| 5,721,781 A | * | 2/1998 | Deo et al. | 705/67 |
| 6,810,479 B1 | * | 10/2004 | Barlow et al. | 713/185 |
| 8,285,329 B1 | * | 10/2012 | Zhu | 455/558 |
| 2002/0134843 A1 | * | 9/2002 | Ashizawa et al. | 235/492 |
| 2003/0145205 A1 | * | 7/2003 | Sarcanin | 713/172 |
| 2004/0015694 A1 | * | 1/2004 | DeTreville | 713/172 |
| 2004/0019790 A1 | * | 1/2004 | Aono et al. | 713/172 |
| 2004/0158742 A1 | * | 8/2004 | Srinivasan et al. | 713/201 |
| 2004/0172542 A1 | * | 9/2004 | Minemura | 713/176 |

(Continued)

FOREIGN PATENT DOCUMENTS

| | | |
|---|---|---|
| CN | 1930557 | 3/2007 |
| EP | 1513113 | 3/2005 |

(Continued)

OTHER PUBLICATIONS

European Patent Office, Extended European Search Report, issued in connection with European Patent Application No. 10007161.2, dated Dec. 27, 2011. (6 pages).

(Continued)

*Primary Examiner* — Techane Gergiso  
(74) *Attorney, Agent, or Firm* — K&L Gates LLP

(57) ABSTRACT

Provided is an information processing apparatus including a reception unit that receives a request for access to an IC chip from an application having access right information for accessing to the IC chip, an acquisition unit that acquires an authentication information for authenticating the application from an external server based on the access right information contained the request for access received by the reception unit, an authentication unit that authenticates the application based on the authentication information obtained by the acquisition unit, and a control unit that controls an access of the application to the IC chip based on an authentication result by the authentication unit.

12 Claims, 18 Drawing Sheets

(56) References Cited

U.S. PATENT DOCUMENTS

| | | |
|---|---|---|
| 2005/0086479 A1* | 4/2005 | Ondet et al. ............... 713/172 |
| 2005/0097327 A1* | 5/2005 | Ondet et al. ............... 713/171 |
| 2005/0173518 A1* | 8/2005 | Takayama .................. 235/380 |
| 2005/0182926 A1 | 8/2005 | Akashika et al. |
| 2006/0036851 A1* | 2/2006 | DeTreville ................. 713/159 |
| 2006/0078109 A1* | 4/2006 | Akashika et al. ............ 380/30 |
| 2006/0107038 A1* | 5/2006 | Kipnis et al. ............... 713/155 |
| 2006/0151599 A1* | 7/2006 | Awatsu et al. .............. 235/380 |
| 2006/0168580 A1* | 7/2006 | Harada et al. .............. 717/174 |
| 2006/0181396 A1 | 8/2006 | Uchida et al. |
| 2008/0059797 A1 | 3/2008 | Tokuno et al. |
| 2008/0082828 A1* | 4/2008 | Jennings et al. ............. 713/176 |
| 2008/0115117 A1* | 5/2008 | Wilkinson et al. ........... 717/139 |
| 2009/0064301 A1* | 3/2009 | Sachdeva et al. ............. 726/9 |
| 2009/0173787 A1* | 7/2009 | Yamagata et al. ........... 235/382 |
| 2009/0198618 A1* | 8/2009 | Chan et al. .................. 705/66 |
| 2009/0276860 A1 | 11/2009 | Miyabashi |

FOREIGN PATENT DOCUMENTS

| | | |
|---|---|---|
| EP | 1863308 | 12/2007 |
| JP | 2001-118034 | 4/2001 |
| JP | 2001-257668 | 9/2001 |
| JP | 2003-018518 | 1/2003 |
| JP | 2003-223235 | 8/2003 |
| JP | 2003-317070 | 11/2003 |
| JP | 2004-038486 | 2/2004 |
| JP | 2005-502128 | 1/2005 |
| JP | 2005-222341 | 8/2005 |
| JP | 2005-293058 | 10/2005 |
| JP | 2005-352908 | 12/2005 |
| JP | 2006-222787 | 8/2006 |
| JP | 2006-246015 | 9/2006 |
| JP | 2008-269172 | 11/2008 |
| WO | 2006033997 | 3/2006 |
| WO | 2007/052388 | 5/2007 |

OTHER PUBLICATIONS

Japanese Office Action issued Aug. 13, 2013 for corresponding Japanese Appln. No. 2009-176574.

Chinese Office Action issued Oct. 17, 2013 for corresponding Chinese Appln. No. 201010235353.1.

Chinese Office Action issued Apr. 28, 204 for corresponding Chinese Appln. No. 201010235353.1.

* cited by examiner

FIG. 10

| ITEM NO. | ITEM NAME | DESCRIPTION |
|---|---|---|
| 1 | APPLICATION IDENTIFIER | INFORMATION TO IDENTIFY APPLICATION |
| 2 | EXECUTABLE COMMAND LIST | LIST OF COMMAND FOR CHIP ACCESS EXECUTABLE BY APPLICATION |
| 3 | ACCESSIBLE AREA LIST | LIST OF CHIP AREA ACCESSIBLE FOR ACCESS BY APPLICATION |
| 4 | SIGNATURE DATA | SIGNATURE DATA CORRESPONDING TO ITEM NO. 1-3 (SIGN with SECRET KEY OF ISSUER SERVER) |

FIG. 12

| ITEM NO | ITEM NAME | DESCRIPTION |
|---|---|---|
| 1 | APPLICATION IDENTIFIER | INFORMATION TO IDENTIFY APPLICATION (USE TO IDENTIFY AUTHENTICATION INFORMATION CORRESPONDING TO ACCESS RIGHT INFORMATION) |
| 2 | APPLICATION SIGNATURE VALUE | SIGNATURE VALUE ADDRESSING TO APPLICATION |
| 3 | PUBLIC KEY FOR SIGNATURE VERIFICATION | PUBLIC KEY CORRESPONDING TO SECRET KEY USED FOR SIGNATURE ADDRESSING TO APPLICATION |
| 4 | SIGNATURE VALUE ADDRESSING TO APPLICATION | SIGNATURE DATA CORRESPONDING TO ITEM NO. 1-3 (SIGN WITH SECRET KEY OF ISSUER SERVER) |

FIG. 18

| ITEM NO. | ITEM NAME | DESCRIPTION |
|---|---|---|
| 1 | APPLICATION IDENTIFIER | INFORMATION TO IDENTIFY APPLICATION (USE TO IDENTIFY AUTHENTICATION INFORMATION CORRESPONDING TO ACCESS RIGHT INFORMATION) |
| 2 | PUBLIC KEY FOR SIGNATURE VERIFICATION | PUBLIC KEY CORRESSPONDING TO SECRET KEY USED FOR SIGNATURE ADDRESSING TO APPLICATION |
| 3 | SIGNATURE DATA | SIGNATURE DATA CORRESPONDING TO ITEM NO. 1 AND 2 (SIGN WITH SECRET KEY OF ISSUER SERVER) |

INFORMATION PROCESSING APPARATUS, PROGRAM, STORAGE MEDIUM AND INFORMATION PROCESSING SYSTEM

CROSS REFERENCES TO RELATED APPLICATIONS

The present application claims priority to Japanese Priority Patent Application JP 2009-176574 filed in the Japan Patent Office on Jul. 29, 2009, the entire content of which is hereby incorporated by reference.

BACKGROUND

The present application relates to an information processing apparatus, a program, a storage medium and an information processing system.

In recent years, information processing apparatuses, such as mobile phones, etc., with tamper-resistant IC chips (hereinafter referred as "secure chips") installed therein have become popular. It is very convenient that a user can perform data communication only by passing such the information processing apparatus over a reader/writer. By applying this information processing apparatus to electronic money systems, for example, the user can complete a payment immediately after just passing the information processing apparatus over the reader/writer at shops, etc.

Further, when using the above electronic money system, the user may start an application installed onto the information processing apparatus so as to confirm a usage history, a balance, etc., on the display screen. Thus, various applications can be installed onto the information processing apparatus.

Various technologies regarding the above-mentioned information processing apparatuses with secure chips have been developed. JP-A-2006-222787 discloses a technology for speedily and securely communicating despite of increases of services, accesses, or the like, by managing access keys which enable a reader/writer to communicate with information processing apparatuses. JP-A-2006-246015 discloses a technology in which a reader/writer authenticates information processing apparatuses by combining one or two kinds of authentication methods, and performs a communication processing to a secure chip.

SUMMARY

There are some applications, among those installed onto the above information processing apparatuses, which attempt fraudulent accesses to secure chips. For this reason, the information processing apparatuses need to prevent such fraudulent accesses. One of examples of the fraudulent accesses is a fraud browsing of usage histories without user permission.

In order to prevent the above-mentioned fraudulent accesses, in the field of information processing apparatuses, there has been a case in which a system operating company modifies a specification of an application manager to a proprietary specification, then limits the modified application manager to be used only on the system the company operates themselves so as to manage an access control to secure chips. When a plurality of system operating companies share an application manager and peripheral systems, complying with a standard specification, however, the application manager cannot be modified its specification since the system's integrity will be impaired if each system operating company modifies the specification on their own. For this reason, there has been a problem that a conventional access control method cannot be applied. There has been another problem that it is not convenient to modify the specification of the application manager in accordance with the application at each time when the access control to secure chips is needed.

In light of the foregoing, it is desirable to provide an information processing apparatus, a program, a storage medium and an information processing system, which are novel and improved, and which are capable of preventing fraudulent accesses to secure chips by an application without modifying a specification of an application manager.

According to an embodiment, there is provided an information processing apparatus including a reception unit that receives a request for access to an IC chip from an application having access right information for accessing to the IC chip, an acquisition unit that acquires an authentication information for authenticating the application from an external server based on the access right information contained the request for access received by the reception unit, an authentication unit that authenticates the application based on the authentication information obtained by the acquisition unit, and a control unit that controls an access of the application to the IC chip based on an authentication result by the authentication unit.

According to such a configuration, fraudulent accesses to secure chips by an application can be prevented without modifying a specification of an application manager.

The information processing apparatus further includes a verification unit that has a first public key of a key pair having a first secret key and the first public key. The access right information may contain a first digital signature using the first secret key of the first key pair. The authentication information may contain a second digital signature using the first secret key of the first key pair. The verification unit may verify the first digital signature contained in the access right information, and verifies the second digital signature contained in the authentication information.

The acquisition unit may obtain binary data of the application from the application. The authentication information may contain a signature value of the application using a second secret key of a second key pair that has the second secret key and a second public key, and the second public key of the second key pair. The authentication unit may authenticate the application by comparing the binary data of the application obtained by the acquisition unit, and a decrypted data that is the signature value of the application contained in the authentication information decrypted using the second public key of the second key pair contained in the authentication information.

The application may have a third public key of a third key pair having a third secret key and the third public key, and a third digital signature using the third secret key of the third key pair. The acquisition unit may obtain the third public key of the third key pair from the application. The authentication information may contain the third public key of the third key pair. The authentication unit may authenticate the application by comparing the third public key of the third key pair obtained by the acquisition unit, and the third public key of the third key pair contained in the authentication information.

The information processing apparatus may further include a storage unit that stores command information for access to the IC chip, which is included in the access right information contained by the application that has been authenticated by the authentication unit. The control unit may permit the application to access to the IC chip when a command for access to the IC chip from the application is contained in the command information for access, which is stored in the storage unit. The control unit may prevent the application from accessing to the IC chip when the command for access to the IC chip from the application is not contained in the command information for access, which is stored in the storage unit.

The storage unit may further store accessible area information of the IC chip, which is included in the access right information contained by the application that has been authenticated by the authentication unit. The control unit may restrict an accessible area of the IC chip to be accessed by the application based on the accessible area information stored in the storage unit.

The information processing apparatus may further include a retention unit that retains the authentication information obtained by the acquisition unit. The authentication unit may authenticate the application based on the authentication information retained by the retention unit.

According to another embodiment, there is provided a program that causes a computer to function as a reception unit that receives a request for access to an IC chip from an application having an access right information for accessing to the IC chip, an acquisition unit that acquires an authentication information for authenticating the application from an external server based on the access right information contained in the request for access received by the reception unit, an authentication unit that authenticates the application based on the authentication information obtained by the acquisition unit, and a control unit that controls an access of the application to the IC chip based on an authentication result by the authentication unit.

According to such a program, fraudulent accesses to secure chips by an application can be prevented without modifying a specification of an application manager.

According to another embodiment, there is provided a storage medium storing a program that causes a computer to function as a reception unit that receives a request for access to an IC chip from an application having an access right information for accessing to the IC chip, an acquisition unit that acquires an authentication information for authenticating the application from an external server based on the access right information contained in the request for access received by the reception unit, an authentication unit that authenticates the application based on the authentication information obtained by the acquisition unit, and a control unit that controls an access of the application to the IC chip based on an authentication result by the authentication unit.

According to such a storage medium, fraudulent accesses to secure chips by an application can be prevented without modifying a specification of an application manager.

According to another embodiment, there is provided an information processing apparatus including an information processing apparatus, and an external server that is capable of communication with the information processing apparatus. The information processing apparatus includes a reception unit that receives a request for access to an IC chip from an application having access right information for accessing to the IC chip, an acquisition unit that acquires an authentication information for authenticating the application from the external server based on the access right information contained in the request for access received by the reception unit, an authentication unit that authenticates the application based on the authentication information obtained by the acquisition unit, and a control unit that controls an access of the application to the IC chip based on an authentication result by the authentication unit.

According to such an information processing apparatus, fraudulent accesses to secure chips by an application can be prevented without modifying a specification of an application manager.

According to an embodiment described above, fraudulent accesses to secure chips by an application can be prevented without modifying a specification of an application manager.

Additional features and advantages are described herein, and will be apparent from the following Detailed Description and the figures.

BRIEF DESCRIPTION OF THE FIGURES

FIG. 10 is an illustration for illustrating a content of the access right information;

FIG. 12 is an illustration for illustrating a content of authentication information;

FIG. 18 is an illustration for illustrating a content of authentication information;

DETAILED DESCRIPTION

Figure 1:
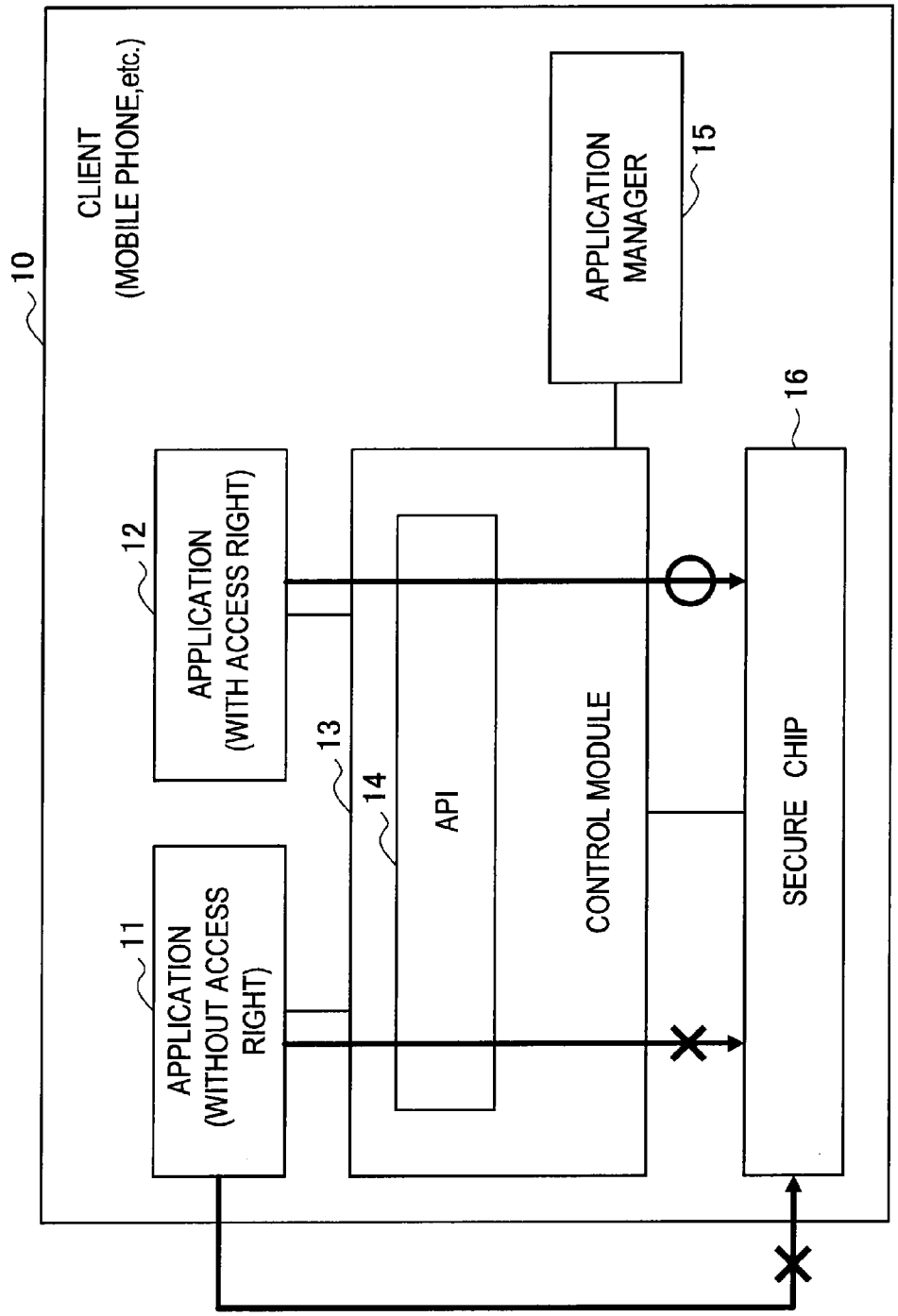
FIG. 1 is an illustration for illustrating an access control to secure chips by an application in a conventional information processing apparatus.

The present application will be described in detail with reference to the drawings according to an embodiment. Note that, in this specification and the appended drawings, structural elements that have substantially the same function and structure are denoted with the same reference numerals, and repeated explanation of these structural elements is omitted.

The explanation is given in the following order:

1. A conventional access control
2. An information processing system according to a first embodiment of the present invention
3. A preliminary processing of access control according to the first embodiment of the present invention 4. A processing of access control according to the first embodiment of the present invention 5. An information processing system according to a second embodiment of the present invention 6. A preliminary processing of access control according to the second embodiment of the present invention 7. 4. A processing of access control according to the second embodiment of the present invention

[A Conventional Access Control]

Before explaining an information processing system according to embodiments of the present invention, first, an explanation will be given on an access control to secure chips by an application in a conventional information processing apparatus. FIG. 1 is an illustration for illustrating the access control to secure chips by an application in a conventional information processing apparatus.

In FIG. 1, a client 10 as an example of the conventional information processing apparatus, such as a mobile phone, includes an application 11, an application 12, a control module 13, an API (Application Program Interface) 14, an application manager 15 and a secure chip 16. The application 11 does not have an access right to the secure chip 16. The application 12 has the access right to the secure chip 16.

In the client 10, if the application 12 requests the control module 13 for an access to the secure chip 16 via the API 14, the application manager 15 determines whether the application 12, which has requested access, has the access right or not. Since the application 12 has the access right to the secure chip 16, the application manager 15 permits the application 12 to access to the secure chip 16. This enables the control module 13 to execute a command for the access to the secure chip 16, which is required by the application 12, onto the secure chip 16.

On the other hand, if the application 11 requests access to the secure chip 16 via the API 14 toward the control module 13, the application 11 will not be permitted to the access to the secure chip 16 since the application 11 does not have the access right to the secure chip 16. Thus, the control module 13 does not execute the command for access to the secure chip 16, which is required by the application 11, onto the secure chip 16. This enables to prevent fraudulent access to the secure chip 16 by the application 11 which does not have the access right. Note that the client 10 has a function to prevent installed applications from accessing to the secure chip 16 bypassing the control module 14.

In the conventional client 10, a system operating company modified a specification of the application manager 15 to a proprietary specification, then limited the modified application manager 15 to be used only on the system the company operates themselves so as to manage the access control to secure chip 16. In a Java application operating in the client 10 such as a mobile phone, for example, an attribution for the access to the secure chip 16 was added to a manifest file and a JAD (Java Application Descriptor). Then the system operating company modified a standard specification of a JAM (Java Application Manager) to a proprietary specification so that the JAM, as an example of the application manager 15, can read the content of the added attribution for the access, and applied the proprietary specification only on the system the company operates themselves.

When a plurality of system operating companies share an application manager and peripheral systems, complying with a standard specification, however, the application manager cannot be modified its specification since the system's integrity will be impaired if each system operating company modifies the specification on their own. For this reason, a conventional access control method cannot be applied, and the fraudulent access to the secure chip 16 by the application cannot be prevented.

The later-described information processing system according to an embodiment executes a later-described preliminary processing of access control and a processing of access control. Thus, fraudulent access to the secure chip 16 by the application can be prevented without modifying the specification of the application manager 15.

[An Information Processing System According to a First Embodiment]

Figure 2:
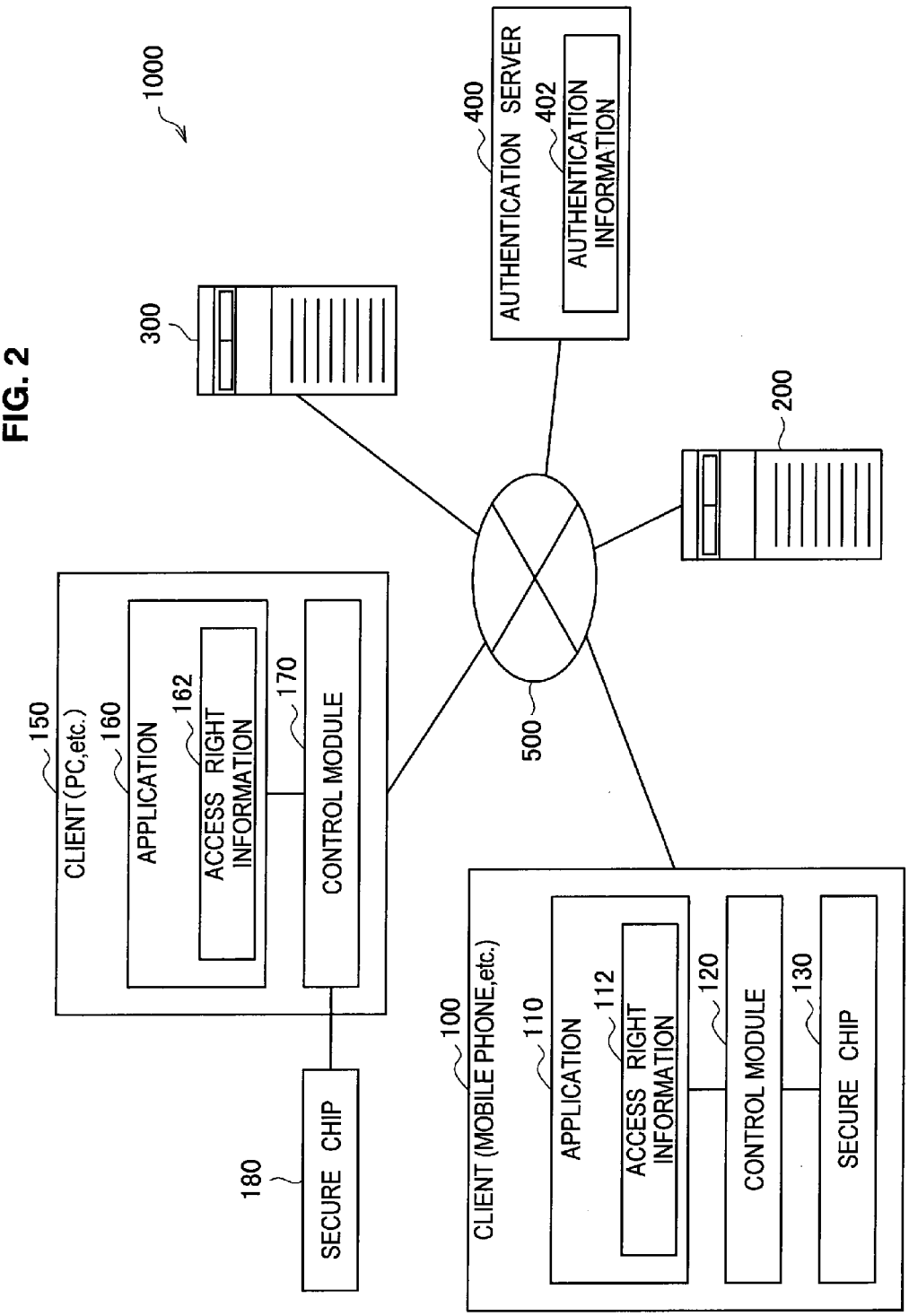
FIG. 2 is an illustration for illustrating a schematic configuration of an information processing system according to a first embodiment.

Next, an explanation will be given on the information processing system according to the first embodiment. FIG. 2 is an illustration for illustrating a schematic configuration of the information processing system according to the first embodiment.

In FIG. 2, an information processing system 1000 as an example of the information processing apparatus of the present invention includes a client 100, such as a mobile phone, an issuer server 200, an application providing server 300 and an authentication server 400. Note that the information processing system 1000 may include a client 150, such as a PC, instead of the client 100. The client 100 and 150 are one of examples of the information processing apparatus of the present invention. The clients 100 and 150, and the servers 200, 300 and 400 are connected to a communication network 400 respectively.

The client 100 includes an application 110, a control module 120 and a secure chip 130. The secure chip 130 is an IC chip with excellent tamper-resistance features. The secure chip 130 includes a non-contact communication device (not shown) to perform non-contact communication with a reader/writer (not shown), for example, and communicates information with the reader/writer in a non-contact manner. Further, the secure chip 130 includes a storage device (not shown) and stores information to communicate in a non-contact manner. Note that the storage device of the secure chip 130 can also store information other than information to communicate in a non-contact manner. The application 110 performs predetermined processing using information stored in the storage device of the secure chip 130. Moreover, the application 110 includes later-described access right information 112 in FIG. 9 and FIG. 10. The control module 120 controls the secure chip 130. For example, the control module 120 controls an access to the secure chip 130 by the application 110 as described later.

The client 150 includes an application 160 and a control module 170, and the control module 170 controls an external secure chip 180. Each of the application 160, the control module 170 and the secure chip 180 has a functional configuration same as the application 110, the control module 120 and the secure chip 130 respectively. Further, the application 160 has access right information 162 same as the access right information 112.

The application providing server 300 creates, for example, the application 110. When creating the application 110 to access to the secure chip 130, the application providing server 300 requests the issuer server 200 for access to the secure chip 130. When the issuer server 200 issues later-described access right information 112, the application providing server 300 embeds the issued access right information 112 into the application 110. Further, the application providing server 300 transmits information for generating later-described authentication information 402 to the issuer server 200. The application providing server 300 provides the application 110 to the client 100 when the client 100 requests for providing of the application 110.

The issuer server 200 generates the access right information 112 after receiving a request for access to the secure chip 130 from the application providing server 300, for example, and issues the generated access right information 112 to the application providing server 300. Further, the issuer server 200 generates the authentication information 402 after receiving information for generating the authentication information 402 from the application providing server 300, and transmits the generated authentication information 402 to the authentication server 400.

The authentication server 400 has the authentication information 402. The authentication server 400 is an example of an external server of the present invention. The authentication server 400 transmits the authentication information 402 to the control module 120, as described later for example, after receiving a request for the authentication information 402 from the control module 120 of the client 100.

The information processing system 1000 can prevent fraudulent accesses to the secure chip 130 by applications without modifying specifications of application managers (not shown) by executing a preliminary processing of access control illustrated in FIG. 4 and a processing of access control illustrated in FIG. 5 described later. Hereinafter, an explanation will be given on a case which the information processing system 1000 is configured from the client 100, the issuer server 200, the application providing server 300 and the authentication server 400.

Figure 3:
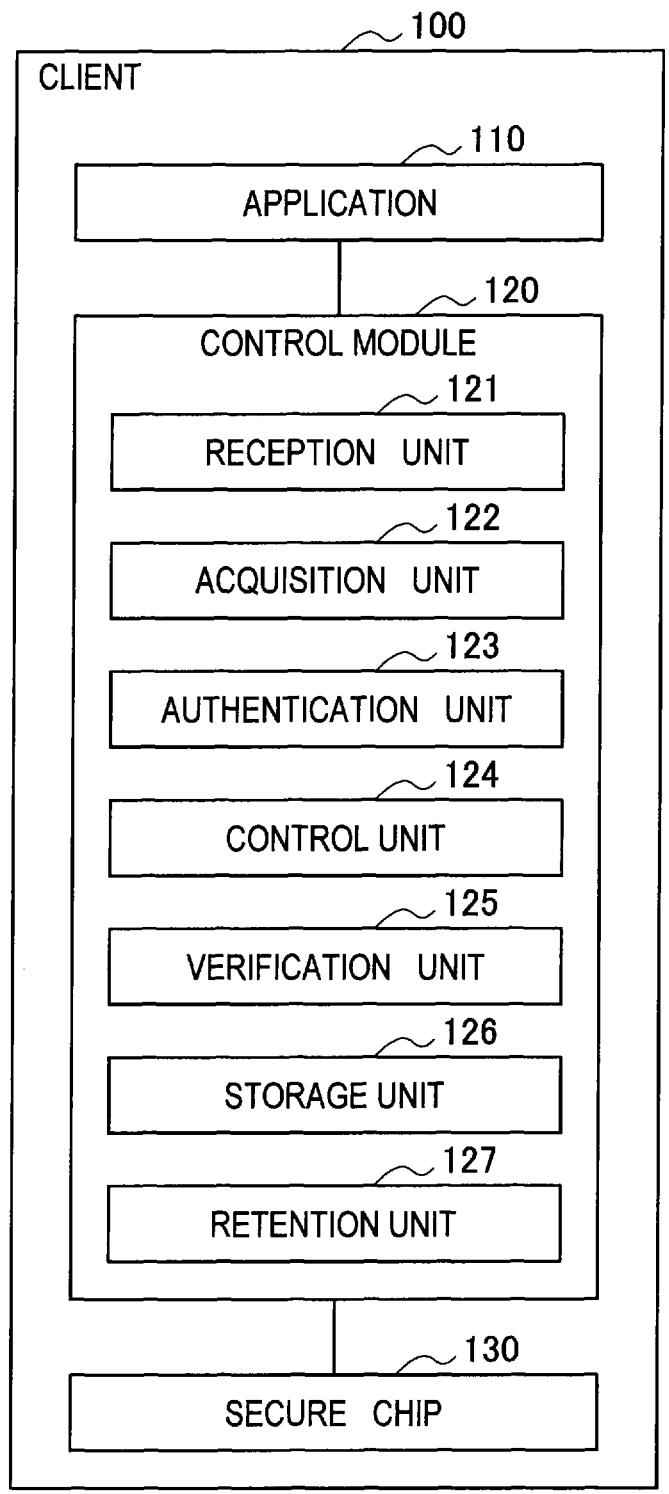
FIG. 3 is an illustration for illustrating a functional configuration of a client in FIG. 2.

Next, an explanation will be given on a functional configuration of the client 100 in FIG. 2. FIG. 3 is an illustration for illustrating the functional configuration of the client 100 in FIG. 2.

In FIG. 3, the client 100 includes the application 110, the control module 120 and the secure chip 130. The control module 120 includes a reception unit 121, an acquisition unit 122, an authentication unit 123, a control unit 124, a verification unit 125, a storage unit 126 and a retention unit 127.

The reception unit 121 receives a request for access to the secure chip 130 from the application 110 which has the access right information 112 to access to the secure chip 130. The acquisition unit 122 obtains the authentication information 402 to authenticate the application 110 from the authentication server 400, based on the access right information 112 contained in the request for access received by the reception unit 121. The authentication unit 123 authenticates the application 110 based on the authentication information 402 obtained by the acquisition unit 122. The control unit 124 controls access to the secure chip 130 by the application 110 based on an authentication result by the authentication unit 123.

The verification unit 125 has a public key of a key pair generated by the issuer server 200 as described later, and verifies a digital signature contained in the access right information 112 and a digital signature contained in the authentication information 402. The storage unit 126 stores command information for the access to the secure chip 130 and accessible area information, which are included in the access right information 112 contained by the application 110 that has been authenticated by the authentication unit 123. The retention unit 127 retains the authentication information 402 obtained by the acquisition unit 122.

[A Preliminary Processing of Access Control According to the First Embodiment of the Present Invention]

Hereinafter, an explanation will be given on a preliminary processing of access control according to the first embodiment. FIG. 4 is a sequence diagram showing the preliminary processing of access control, executed by the information processing apparatus according to the first embodiment.

Figure 4:
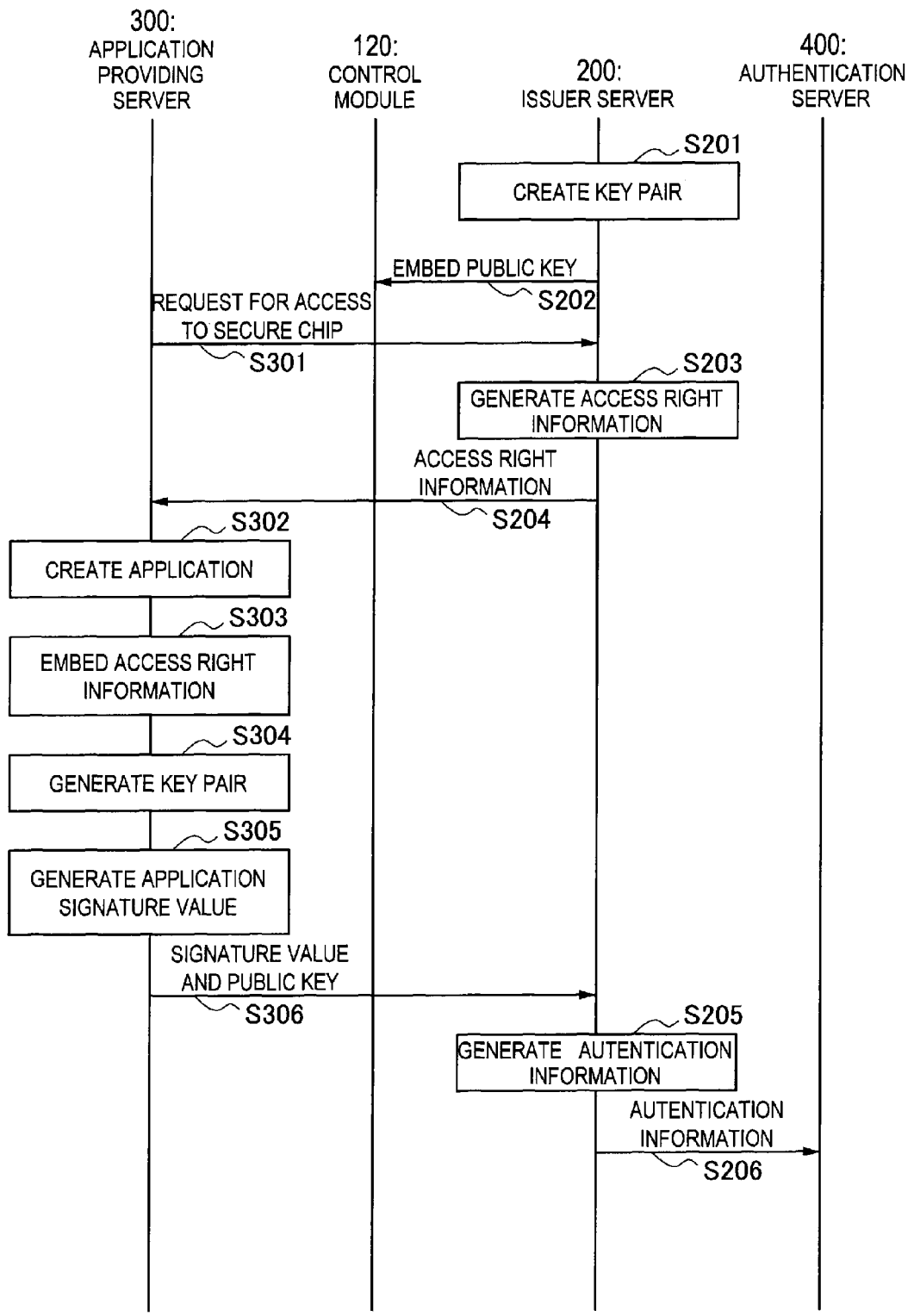
FIG. 4 is a sequence diagram showing a preliminary processing of access control, executed by the information processing apparatus according to the first embodiment.

In FIG. 4, first, the issuer server 200 generates a key pair for a digital signature as an example of the key pair according to a first embodiment (step S201). Then, next, the issuer server 200 embeds a public key (not shown) of the generated key pair in the control module 120 of the client 100 (step S202).

Next, the application providing server 300 requests the issuer server 200 for access to the secure chip 130 so that the application 110 to be generated will be able to access to the secure chip 130 of the client 100 (step S301). Specifically, the application providing server 300 transmits, to the issuer server 200, a list of commands for chip access to be preferably executed and a list of chip areas to be preferably accessed.

Figure 9:
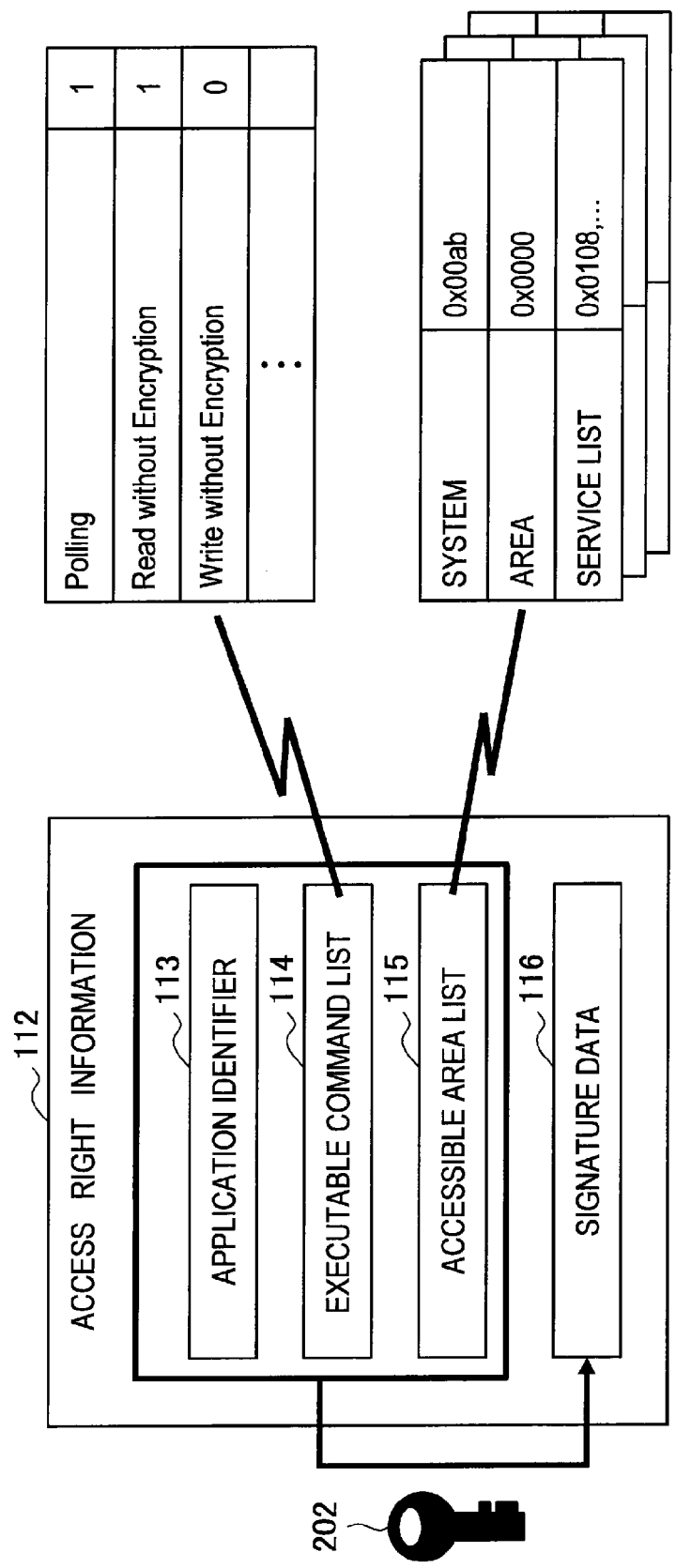
FIG. 9 is an illustration for illustrating a content of the access right information.

Next, the issuer server 200 which has received the request for access to the secure chip 130 generates the access right information 112 illustrated in FIGS. 9 and 10, based on the contents of the request for access. As illustrated in FIGS. 9 and 10, the access right information 112 is configured from an application identifier 113, an executable command list 114, an accessible area list 115 and a signature data 116. The application identifier 113 is information for identifying the application 110. The executable command list 114 is a list of commands for chip access, the commands which are executable by the application 110. The accessible area list 115 is a list of chip areas accessible by the application 110. The signature data 116 is a digital signature corresponding to the application identifier 113, the executable command list 114 and the accessible area list 115, using a secret key 202 of the key pair generated in step S201. The signature data 116 is an example of the first digital signature according to an embodiment. The issuer server 200 issues the generated access right information 112 to the application providing server 300 (step S204).

Next, the application providing server 300 creates the application 110 (step S302), and embeds the access right information 112, issued in step S204, to the created application 110 (step S303). The application providing server 300, as described later, enables the application 110 to pass the access right information 112 to the control module 120 when the application 110 requests the control module 120 for access to the secure chip 130.

Figure 11:
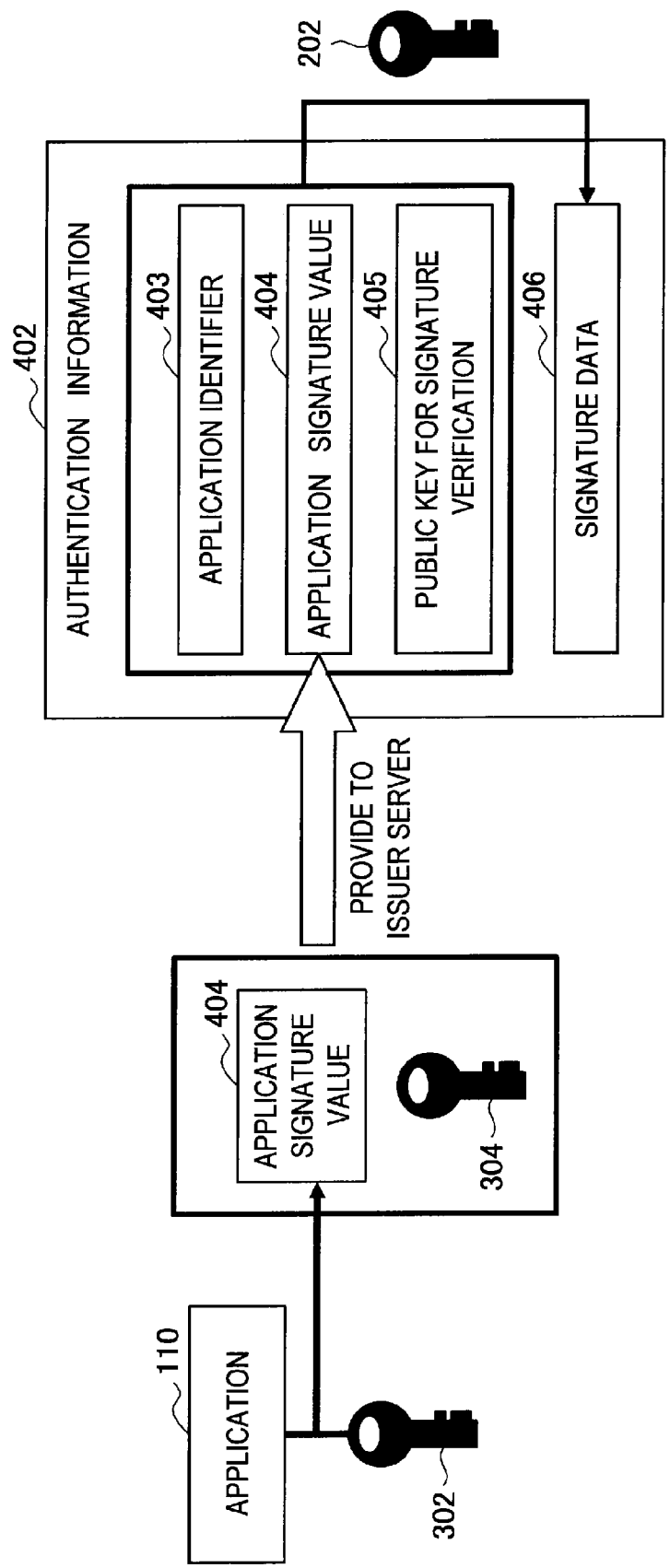
FIG. 11 is an illustration for illustrating a content of authentication information.

Next, the application providing server 300 generates a key pair for the digital signature as an example of a second key pair (step S304), and as illustrated in FIG. 11, generates an application signature value 404 of the application 110 using a secret key 302 of the generated key pair (step S305). Then, the application providing server 300, as illustrated in FIG. 11, provides the application signature value 404 generated in step S305 and a public key 304 of the key pair generated in step S304, to the issuer server 200 (step S306).

Next, the issuer server 200 generates the authentication information 402 illustrated in FIGS. 11 and 12 based on the application signature value 404 and the public key 304 which have been provided (step S205). As illustrated in FIGS. 11 and 12, the authentication information 402 is configured from an application identifier 403, an application signature value 404, a public key for signature verification 405 and a signature data 406. The application identifier 403 is information for identifying the application 110. The application signature value 404 is a signature value addressing to the application 110. The public key for signature verification 405 is the public key 304 corresponding to the secret key 302 used for performing the digital signature addressing to the application 110. The signature data 406 is a digital signature corresponding to the application identifier 403, the application signature value 404 and the public key for signature verification 405, using the secret key 202 of the key pair generated in step S201. The signature data 406 is an example of the second digital signature of the present invention. The issuer server 200 transmits the generated authentication information 402 to the authentication server 400 (step S206), and the authentication server 400 registers the received authentication information 402 and ends this processing.

[A Processing of Access Control According to the First Embodiment]

Hereinafter, an explanation will be given on a processing of access control executed by the information processing system according to the first embodiment. FIG. 5 is a sequence diagram showing a processing of access control, executed by the information processing system according to the first embodiment. This processing is executed after the preliminary processing of access control in FIG. 4.

Figure 5:
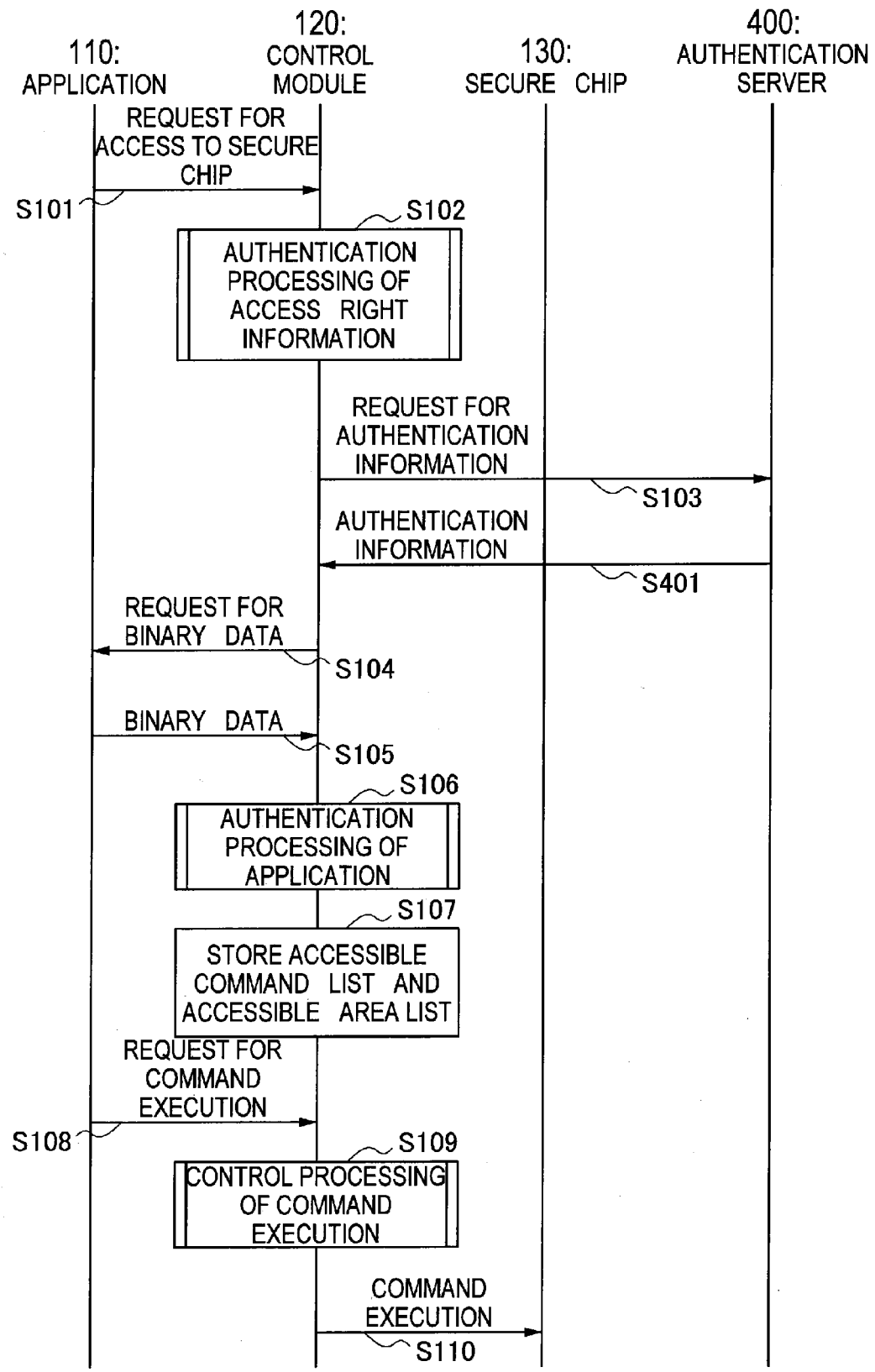
FIG. 5 is a sequence diagram showing a processing of access control, executed by the information processing apparatus according to the first embodiment.

In FIG. 5, first, the application 110 requests the control module 120 for access to the secure chip 130 (step S101). At this time, the application 110 passes the embedded access right information 112 to the control module 120.

Next, the control module 120, which has received the request for access to the secure chip 130, executes a later-described authentication processing of access right information in FIG. 6, and authenticates a validity of the access right information 112 passed from the application 110 (step S102).

If the authentication processing of access right information in step S102 is successfully completed, the control module 120 requests the authentication server 400 for the authentication information 402 corresponding to the access right information 112 (step S103). At this time, the control module 120 passes the application identifier 113 included in the access right information 112 to the authentication server 400.

Next, the authentication server 400 which has received the request for the authentication information 402, transmits the authentication information 402 to the control module 120 (step S401). Specifically, the authentication server 400 transmits, to the control module 120, the authentication information 402 which includes the application identifier 403 identical to the application identifier 113 passed from the control module 120.

Next, the control module 120 which has received the request for the authentication information 402, requests the application 110 for binary data of the application 110 (step S104). Then the application 110 which has received the request for the binary data of the application 110 transmits the binary data of the application 110 to the control module 120 (step S105).

Next, the control module 120 which has received the authentication information 402 executes a later-described authentication processing of application in FIG. 7, and authenticates a validity of the access right to the secure chip 130 for the application 110 which is requesting for access to the secure chip 130 (step S106).

If the authentication processing of application in step S106 is successfully completed, the control module 120 stores the executable command list 114 and the accessible area list 115, which are included in the access right information 112, onto the storage device (not shown) (step S107)

Then the application 110 requests the control module 120 to execute an command for chip access (step S108). The control module 120, which has received the request for executing the command for chip access, executes a later-described control processing of command execution in FIG. 8 and determines whether to execute the requested command for chip access or not (step S109).

If a control processing of command execution in step S109 is successfully completed, the control module 120 executes the requested command for chip access to the secure chip 130 (step S110) and ends this processing.

Figure 6:
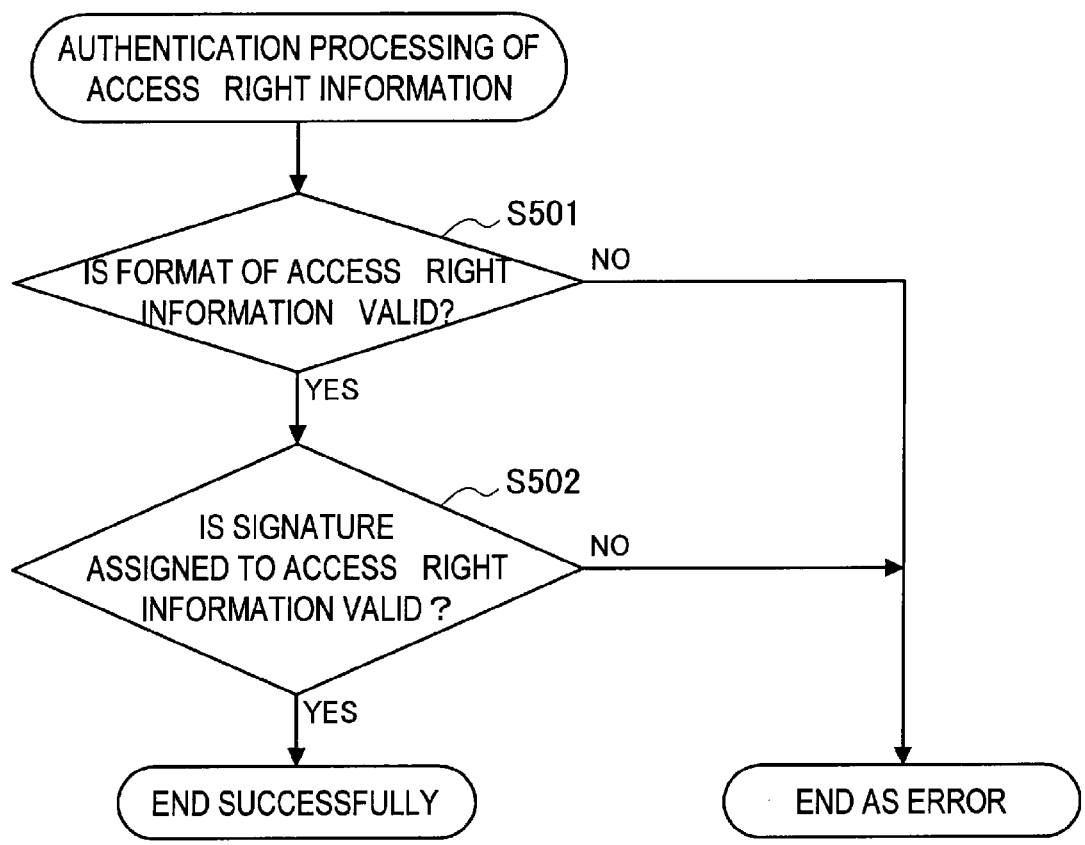
FIG. 6 is a flow chart showing an authentication processing of access right information executed in step S102 in FIG. 5.

FIG. 6 is a flow chart showing an authentication processing of access right information executed in step S102 in FIG. 5.

In FIG. 6, first, the control module 120 determines whether there is validity in a format of the access right information 112 passed from the application 110 (step S501). Specifically, the control module 120 determines whether the format of the access right information 112 is a format, like the one illustrated in FIG. 10, defined in the step S203 in FIG. 4 when the access right information 112 was generated by the issuer server 200.

If the format of the access right information 112 is valid (YES in step S501), the control module 120 verifies the signature data 116 included in the access right information 112 using the public key embedded in step S202 in FIG. 4. The control module 120 determines whether the signature data 116 is valid or not (step S502). Specifically, the control module 120 decrypts the signature data 116 using the public key embedded in step S202, determines whether the decrypted data is identical to the target data for the signature, that are the application identifier 113, the executable command list 114 and the accessible area list 115, and determines whether the signature data 116 is valid or not.

If the signature data 116 is valid (YES in step S502), the control module 120 authenticates that the access right information 112 is valid, and ends successfully this processing. If the format of the access right information 112 is not valid (NO in step S501) or if the signature data 116 is not valid (NO in step S502), the control module 120 determines that the access right information 112 is not valid, and ends this processing as an error.

According to the authentication processing of access right information in FIG. 6, if the format of the access right information 112 or the signature data 116 is invalid, that is if the access right information 112 has not issued validly by the issuer server 200, this processing is to be ended as an error. This prohibits the application (not shown) including the access right information 112 which has not been issued validly by the issuer server 200 from accessing to the secure chip 130.

Figure 7:
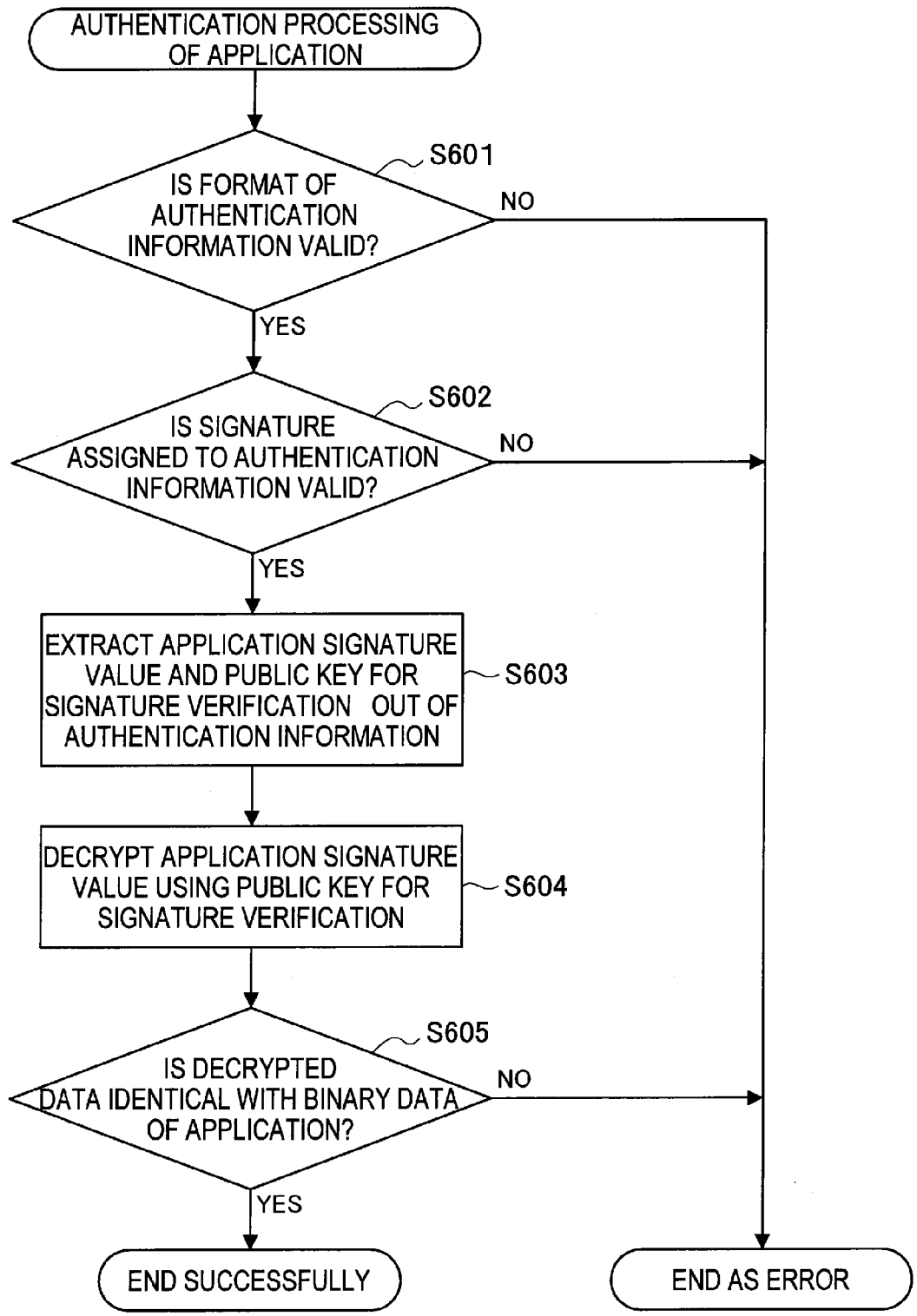
FIG. 7 is a flow chart showing an authentication processing of application executed in step S106 in FIG. 5.

FIG. 7 is a flow chart showing an authentication processing of application executed in step S106 in FIG. 5.

In FIG. 7, first, the control module 120 determines whether a format of the authentication information 402 received is valid (step S601). Specifically, the control module 120 determines whether the format of the authentication information 402 is same as a format, like the one illustrated in FIG. 12, defined in the step S205 in FIG. 4 when the authentication information 402 was generated by the issuer server 200.

If the format of the authentication information 402 is valid (YES in step S601), the control module 120 verifies the signature data 406 included in the authentication information 402 using the public key embedded in step S202 in FIG. 4. The control module 120 determines whether the signature data 406 is valid or not (step S602). Specifically, the control module 120 decrypts the signature data 406 using the public key embedded in step S202, determines whether the decrypted data is identical to the target data for the signature, that are the application identifier 403, the application signature value 404 and the public key for signature verification 405, and determines whether the signature data 406 is valid or not.

If the format of the authentication information 402 is not valid (NO in step S601) or if the signature data 406 is not valid (NO in step S602), the control module 120 determines that the authentication information 402 is not valid, and ends this processing as an error.

If the signature data 406 is valid (YES in step S602), the control module 120 extracts the application signature value 404 and the public key for signature verification 405 out of the received authentication information 402 (step S603).

Next, the control module 120 decrypts the extracted application signature value 404 using the public key for signature verification 405 (step S604). The control module 120 determines whether the decrypted data of the application signature value 404 extracted out of the authentication information 402 is identical to the binary data of the application 110 received in step S105 in FIG. 5 (step S605). Note that the decrypted data of the application signature value 404 corresponds to the binary data of the application 110.

If the decrypted data of the application signature value 404 is identical to the binary data of the application 110 (YES in step S605), the control module 120 authenticates that the application 110 is valid, and ends this processing successfully. If the decrypted data of the application signature value 404 is not identical to the binary data of the application 110 (NO in step S605), the control module 120 determines that the application 110 is invalid and ends this processing as an error.

According to the authentication processing of application in FIG. 7, if the decrypted data of the application signature value 404 extracted out of the authentication information 402 is not identical to the binary data of the application 110 received from the application 110, that is if an invalid application (not shown) obtains the access right information 112, the processing is to be ended as an error. This prohibits the invalid application (not shown) which obtains the access right information 112 from accessing to the secure chip 130.

In the above-described authentication processing of application in FIG. 7, if a secured communication path is prepared in advance between the client 100 and the authentication server 400, there is no target likely to be altered in the authentication information 402, so it is not necessarily need to authenticate validity of the authentication information 402. In other words, in the authentication processing of application in FIG. 7, the processing of step S603 is executed at first without executing the processing of step S601 and step S602. This decreases the number of steps in the authentication processing of application.

Figure 8:
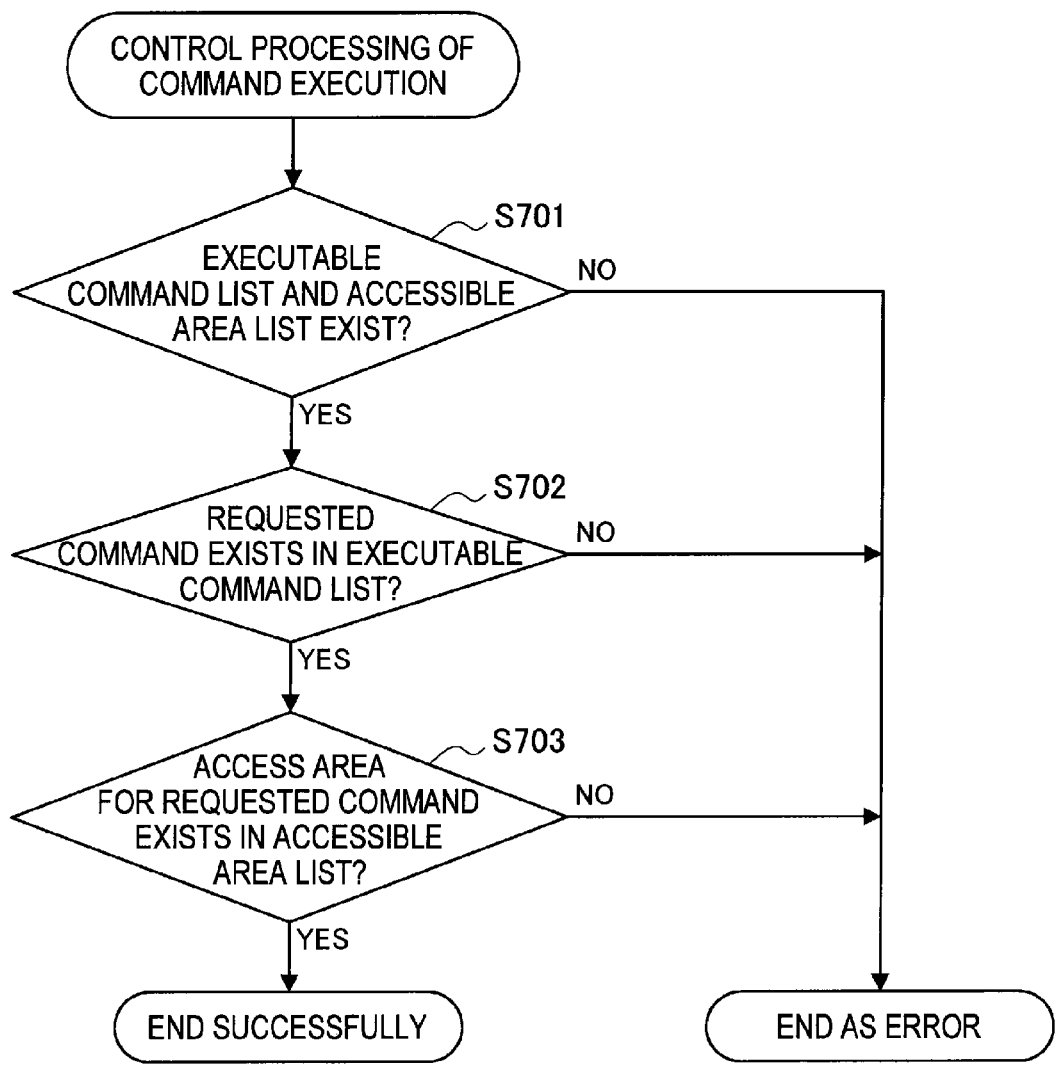
FIG. 8 is a flow chart showing a control processing of command execution executed in step S109 in FIG. 5.

FIG. 8 is a flow chart showing a control processing of command execution executed in step S109 in FIG. 5.

In FIG. 8, first, the control module 120 determines whether the storage device (not shown) stores the executable command list 114 and the accessible area list 115 or not (step S701).

If the storage device stores the executable command list 114 and the accessible area list 115 (YES in step S701), the control module 120 determines whether the command for chip access requested in step S108 in FIG. 5 exists in the executable command list 114. If the storage device does not store neither the executable command list 114 nor the accessible area list 115 (NO in step S701), the control module 120 determines that the command for chip access is not executable, and ends this processing as an error.

If there is the requested command for chip access in the executable command list 114 (YES in step S702), the control module 120 determines whether there is the access area for the requested command for chip access in the accessible area list 115 (step S703). If there is not the requested command for chip access in the executable command list 114 (NO in step S702), the control module 120 determines that the requested command for access chip is not executable, and ends this processing as an error.

If there is the access area for the requested command for chip access in the accessible area list 115 (YES in step S703), the control module 120 determines that the requested command for chip access is executable, and ends this processing successfully. If there is not the access area for the requested command for chip access in the accessible area list 115 (NO in step S703), the control module 120 determines that the requested command for chip access is not executable, and ends this processing as an error.

According to the control processing of command execution in FIG. 8, when the storage device does not store neither the executable command list 114 nor the accessible area list 115, that is when the execution request for command for chip access is requested by an application (not shown) which has requested the control module 120 for access to the secure chip 130, but whose the access right information and the application itself have not been authenticated, this processing will be ended as an error. This enables to prevent access to the secure chip 130 by the application (not shown) whose the access right information and the application itself have not been authenticated by the control module 120.

If the requested command for chip access does not exist in the executable command list 114, that is when the application 110 requests for execution of the command for chip access which is not permitted to be executed, this processing will be ended as an error. This enables to prevent the execution of the command for chip access which is not permitted to be executed by the application 110.

If the access area for the requested command for chip access does not exist in the accessible area list 115, that is when the application 110 requests for execution of the command for chip access which exceeds the area permitted to be accessed, this processing will be ended as an error. This enables to prevent the application 110 from executing the command of chip access which exceeds the area permitted to be accessed.

As described above, according to the processing of access control in FIG. 5, by executing the authentication processing of access right information in FIG. 6, the authentication processing of application in FIG. 7 and the control processing of command control in FIG. 8, which are described above, it prevents fraudulent accesses to the secure chip 130 by applications. Further, the control module 120 controls access to the secure chip to 130 by the application 110 based on the access right information 112 contained by the application 110, and the authentication information 402 obtained from the authentication server 400. Therefore, for the purpose of access control, it is not necessarily need to modify the specification of the application manager (not shown) which performs control or the like of the installed applications, or the like. This enables to prevent fraudulent accesses to the secure chip 130 by applications without modifying the specification of the application manager (not shown).

In the above-described processing of access control in FIG. 5, the control module 120 may retain the authentication information 402 in the storage device (not shown) after receiving the authentication information 402 transmitted from the authentication server 400 in step S401. Then, if the authentication information 402 corresponding to the access right information 112 is retained in the storage device in step S103, the control module 120 performs an authentication processing of application in step S106 using the authentication information 402 retained in the storage device, without requesting the authentication server 400 for the authentication information 402. This enables to decreases the number of steps of the processing of access control.

[Information Processing System According to Second Embodiment]

Figure 13:
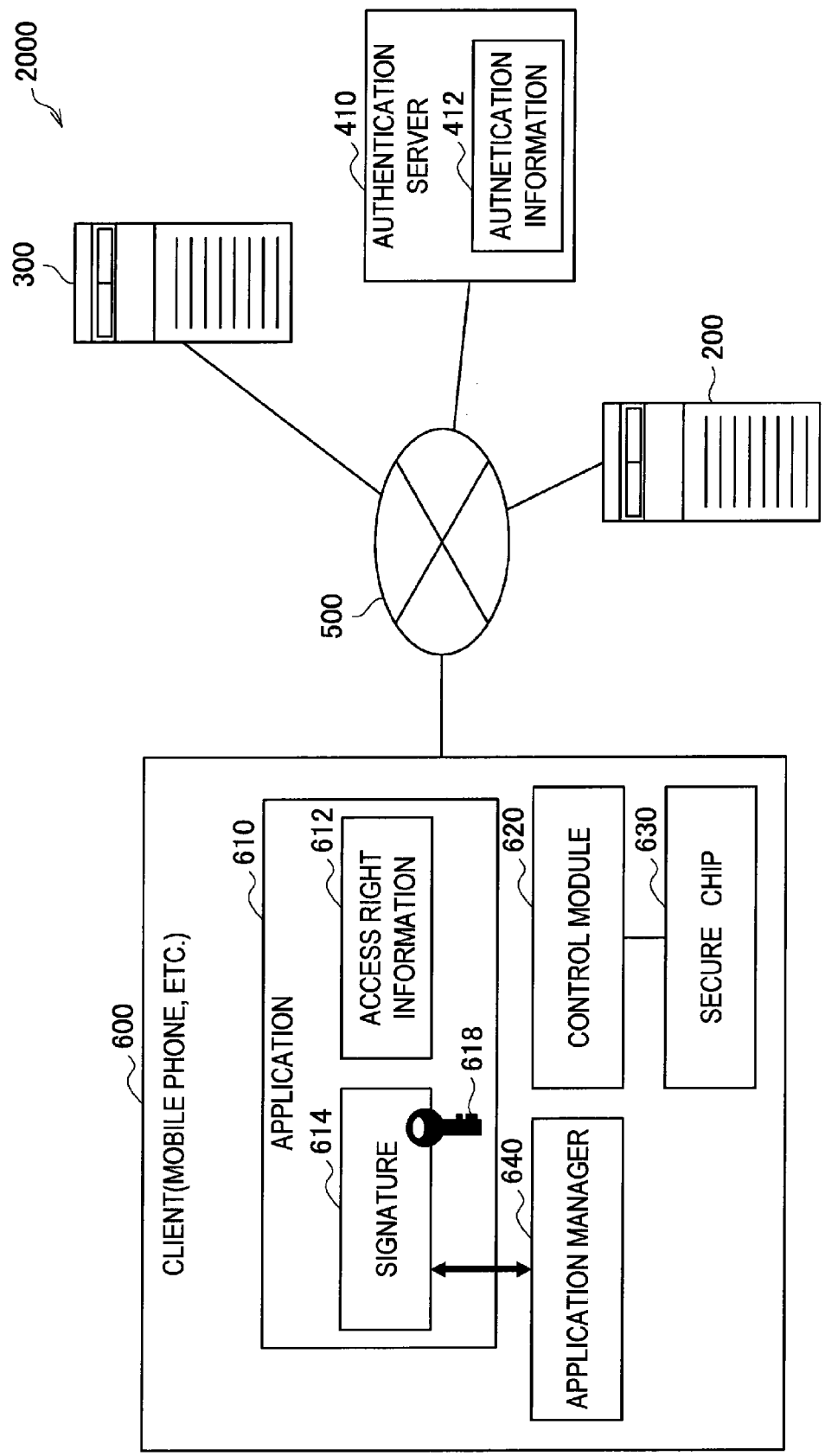
FIG. 13 is an illustration for illustrating a schematic configuration of an information processing system according to a second embodiment of the present invention.

Next, an information processing system according to a second embodiment will be given. The information processing system according to the present embodiment differs from the one in the first embodiment only on the point that applications to be installed onto clients have a digital signature and a public key. So explanations will be omitted for the same configurations and functions, and the explanation only for the different configurations and functions will be given in the following. FIG. 13 is an illustration for illustrating a schematic configuration of the information processing system according to the second embodiment.

In FIG. 13, an information processing system 2000 as an example of the information processing system of the present invention includes a client 600, such as a mobile phone, an issuer server 200, an application providing server 300 and an authentication server 410. The client 600 is an example of the information processing apparatus of the present invention. The client 600, the servers 200, 300 and 410 are connected to the communication network 500 respectively.

The client 600 includes an application 610, a control module 620, a secure chip 630 and an application manager 640. The secure chip 630 has the same structure of the secure chip 130 described above. The application 610 performs predetermined processing using information stored in the storage device of the secure chip 630. The application 610 has access right information 612. The access right information 612 has the same structure of the access right information 112 described above. The application 610 has a digital signature 614 of the application 610 using a secret key (not shown) of a key pair generated in a later-described application providing server 300, and a public key 618 out of the key pair. The digital signature 614 is an example of a third digital signature of the present invention. The application manager 640 authenticates the digital signature 614 using the public key 618 contained in the application 610 when installing the application 610 onto the client 600, and authenticates the application 610. The control module 620 controls the secure chip 630. The control module 620 controls, for example, access to the secure chip 630 by the application 610 as described later.

The application providing server 300 creates, for example, the application 610. The application providing server 300 requests the issuer server 200 for the secure chip 630 when creating the application 610 for access to the secure chip 630. When the issuer server issues the access right information 612, the application providing server 300 embeds the issued access right information 612 into the application 610. Further, the application providing server 300 transmits information for generating later-described authentication information 412 to the issuer server 200. The application providing server 300 provides the application 610 to the client 600 when the client 600 requests for providing of the application 610.

The issuer server 200 generates the access right information 612 after receiving a request for access to the secure chip 130 from the application providing server 300, for example, and issues the generated access right information 612 to the application providing server 300. Further, the issuer server 200 generates the authentication information 412 after receiving information for generating the authentication information 412 from the application providing server 300, and transmits the generated authentication information 412 to the authentication server 410.

The authentication server 410 has the authentication information 412. The authentication server 410 is an example of an external server of the present invention. The authentication server 410 transmits the authentication information 412 to the control module 620, as described later for example, after receiving a request for the authentication information 412 from the control module 620 of the client 600

The information processing system 2000 can prevent fraudulent accesses to the secure chip 630 by applications without modifying specifications of application manager 640 or the like by executing a preliminary processing of an access control illustrated in FIG. 14 and a processing of the access control illustrated in FIG. 15 described later.

[A Preliminary Processing for the Access Control According to Second Embodiment]

Hereinafter, an explanation will be given on a preliminary processing for an access control, executed by the information processing apparatus according to the second embodiment. The preliminary processing for the access control according to the present embodiment differs from the one in the first embodiment only on the points that the application providing server 300 provides only the public key of the key pair to the issuer server 200 in step S306 in FIG. 4, and that the issuer server 200 generates the authentication information based on only the public key in step S205, or the like. So explanations will be omitted for the same configurations and functions, and the explanation only for the different configurations and functions will be given in the following. FIG. 14 is a sequence diagram showing the preliminary processing for the access control, executed by the information processing apparatus according to the second embodiment of the present invention.

Figure 14:
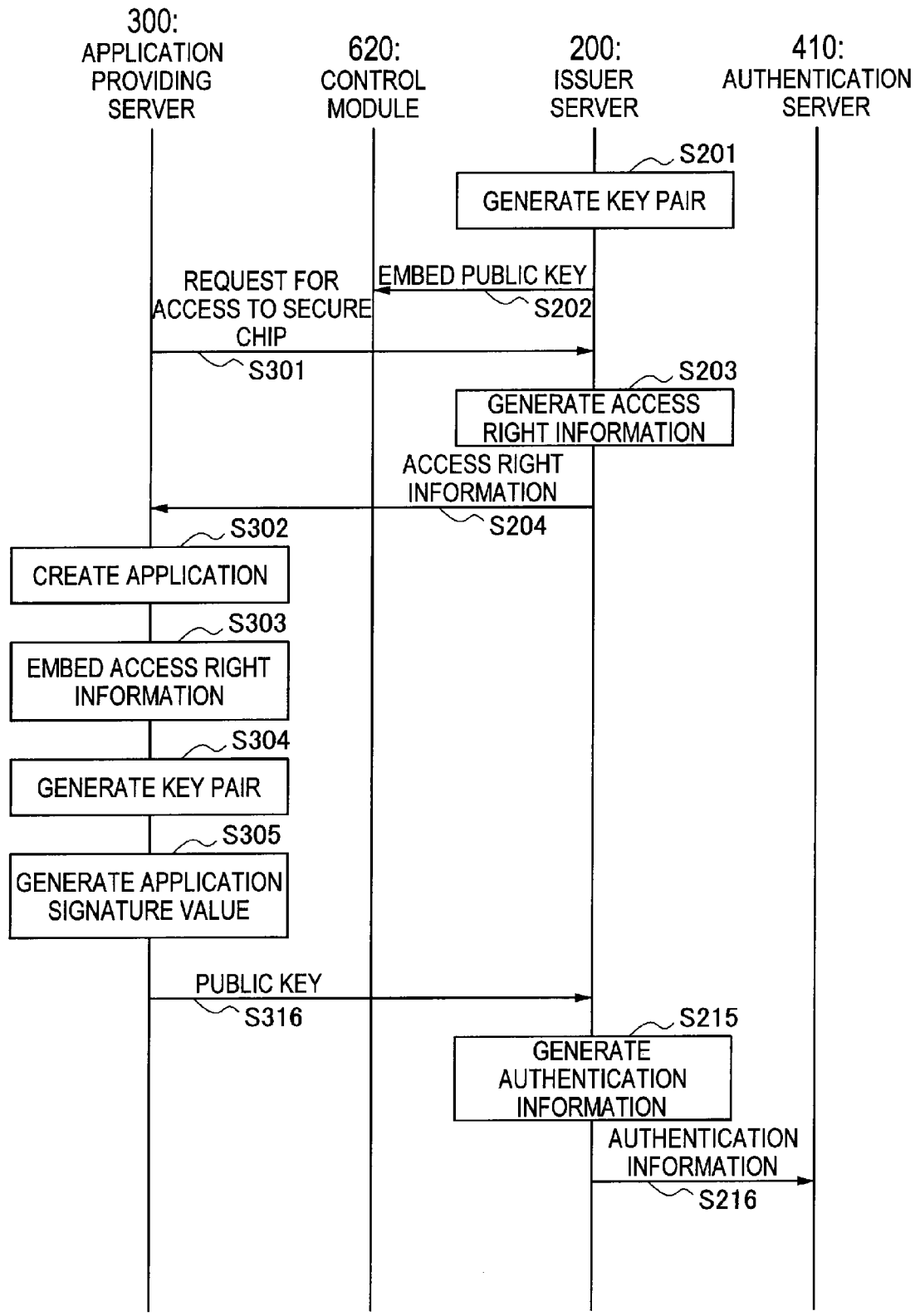
FIG. 14 is a sequence diagram showing a preliminary processing of access control, executed by the information processing apparatus according to the second embodiment.

In FIG. 14, first, the issuer server 200 generates a key pair (step S201). Next, the issuer server 200 embeds a public key (not shown) of the generated key pair into the control module 120 of the client 100 (step S202). Then the application providing server 300 requests the issuer server 200 for access to the secure chip 130 (step S301).

Next, the issuer server 200 generates the access right information 612 same as the access right information 112 illustrated in FIGS. 9 and 10 (step S203). Then the issuer server 200 issues the generated access right information 612 to the application providing server 300 (step S204).

Next, the application providing server 300 creates the application 610 (step S302), and embeds the access right information 612 issued in step S204 into the created application 610 (step S303).

Figure 17:
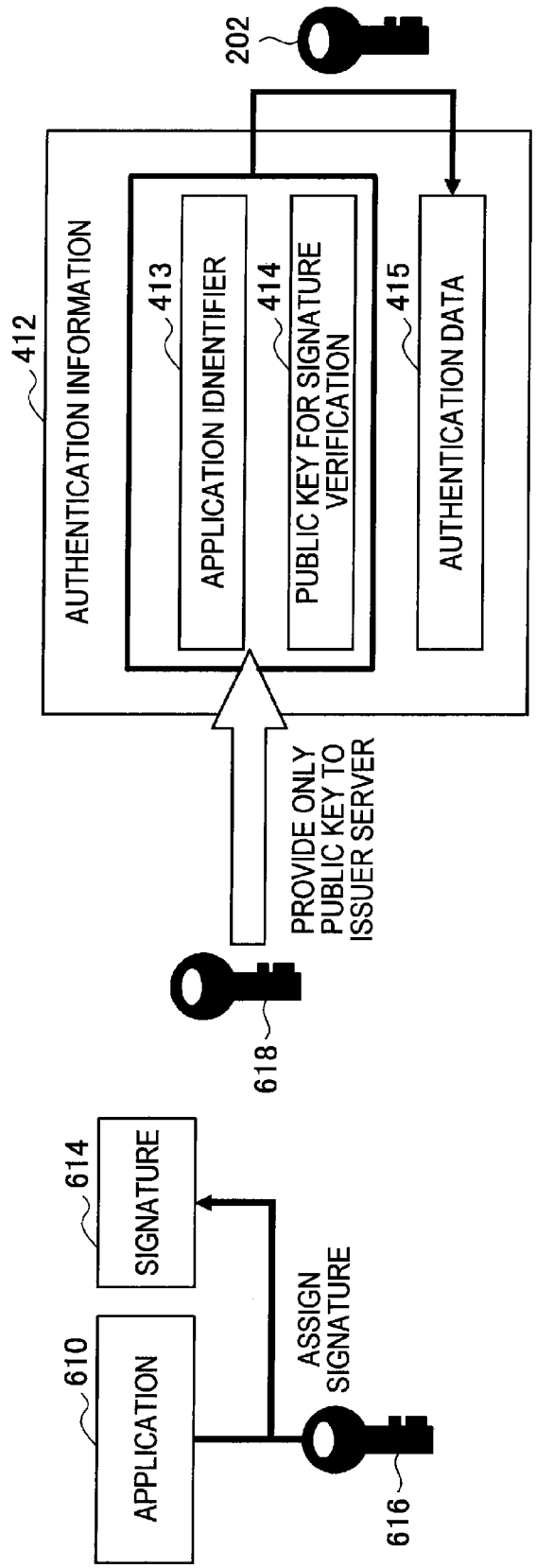
FIG. 17 is an illustration for illustrating a content of authentication information.

Next, the application providing server 300 generates a key pair for a digital signature, as an example of a third key pair of the present invention (step S304), and assigns the digital signature to the application 610 using a secret key 616 of the generated key pair (step S305), as illustrated in FIG. 17. This enables to assign, to the application 610, a digital signature 614 and a public key 618 of the generated key pair in step S304. Further, the application providing server 300 provides only the public key 618 of the key pair generated in step S304, to the issuer server 200, as illustrated in FIG. 17 (step S316).

The issuer server 200 generates the authentication information 412 illustrated in FIGS. 17 and 18 based on the provided public key 618 (step S215). As illustrated in FIGS. 17 and 18, the authentication information 412 is configured from an application identifier 413, a public key for signature verification 415 and a signature data 415. The application identifier 413 is information for identifying the application 610. The public key for signature verification 414 is the public key 618 corresponding to the secret key 616 used for performing the digital signature addressing to the application 610. The signature data 415 is a digital signature corresponding to the application identifier 413 and the public key for signature verification 414, using the secret key 202 of the key pair generated in step S201. The issuer server 200 transmits the generated authentication information 412 to the authentication server 410 (step S216), and the authentication server 410 registers the received authentication information 412 and ends this processing.

[Information Processing System According to Second Embodiment]

Hereinafter, an explanation will be given on a processing of access control executed by the information processing system according to the second embodiment. FIG. 15 is a sequence diagram showing a processing for the access control, executed by the information processing apparatus according to the second embodiment of the present invention. This processing is to be executed after the preliminary processing for the access control in FIG. 14.

Figure 15:
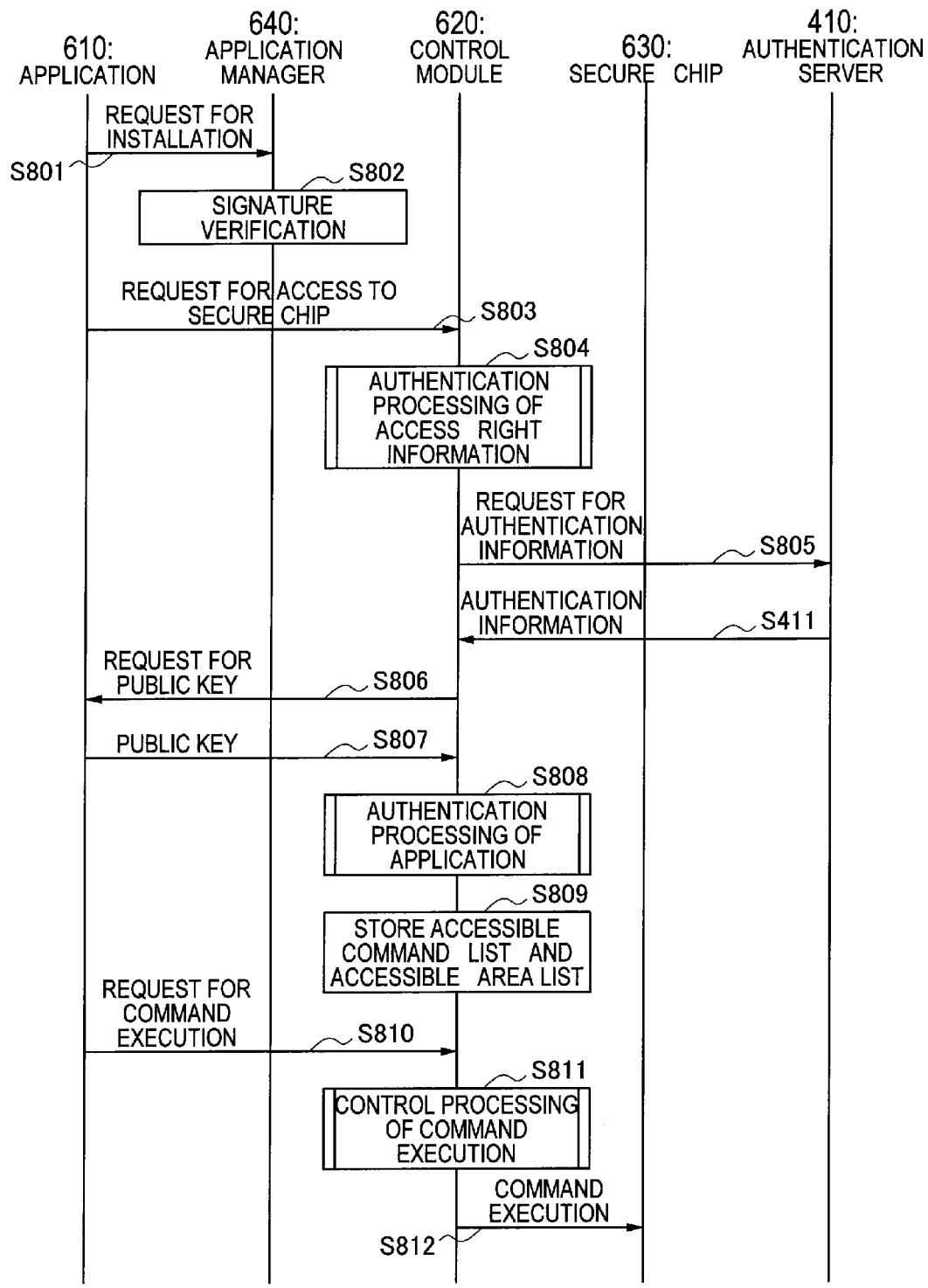
FIG. 15 is a sequence diagram showing a processing of access control, executed by the information processing apparatus according to the second embodiment.

In FIG. 15, first, the application 610 requests the application manager 640 to install to the client 600 (step S801). At this time, the application 610 passes the digital signature 614 and the public key 618, which have been assigned to the application 610, to the application manager 640.

Next, the application manager which has received the request for installing of the application 610 verifies the digital signature 614 using the public key 618 (step S802). If the digital signature 614 is valid in the result of the verification in step S802, the installation of the application 610 into the client 600 is to be permitted. On the other hand, if the digital signature 614 is not valid in the result of the verification in step S802, the installation of the application 610 to the client 600 is not to be permitted.

After the installation of the application 610 to the client 600, the application 610 requests the control module 620 for access to the secure chip 630 (step S803). At this time, the application 610 passes the embedded access right information 612 to the control module 620.

Next, the control module 620 which has received the request for access to the secure chip 630, executes an authentication processing of access right information same as the one in FIG. 6 described above, and authenticates the validity of the access right information 612 passed from the application 610 (step S804).

If the authentication processing of access right information in step S804 is successfully completed, the control module 620 requests the authentication server 410 for the authentication information 412 corresponding to the access right information 612 (step S805). At this time, the control module 620 passes the application identifier (not shown) included in the access right information 612 to the authentication server 410.

Next, the authentication server 410 which has received the request for the authentication information 412, transmits the authentication information 412 to the control module 620. Specifically, the authentication server 410 transmits, to the control module 620, the authentication information 412 which includes the application identifier 413 identical to the application identifier (not shown) passed from the control module 620.

Next, the control module 620 which has received the request for the authentication information 412, requests the application 610 for the public key 618 (step S806). Then the application 610 which has received the request for the public key 618 transmits the public key 618 to the control module 620 (step S807).

Next, the control module 620 executes a later-described authentication processing of application in FIG. 16, and authenticates the validity of the access right of the application 610 to the secure chip 630, the application 610 which requests for access to the secure chip 630 (step S808).

If the authentication processing of application in step S808 is successfully completed, the control module 620 stores the executable command list (not shown) and the accessible area list (not shown), which are included in the access right information 612, onto the storage device (not shown) (step S809).

Then the application 610 requests the control module 620 to execute an command for chip access (step S810). The control module 620, which has received the request for executing the command for chip access, executes a control processing of command execution same as the one in FIG. 8 described above, and determines whether to execute the requested command for chip access or not (step S811).

If a control processing of command execution in step S811 is successfully completed, the control module 620 executes the requested command for chip access to the secure chip 630 (step S812) and ends this processing.

Figure 16:
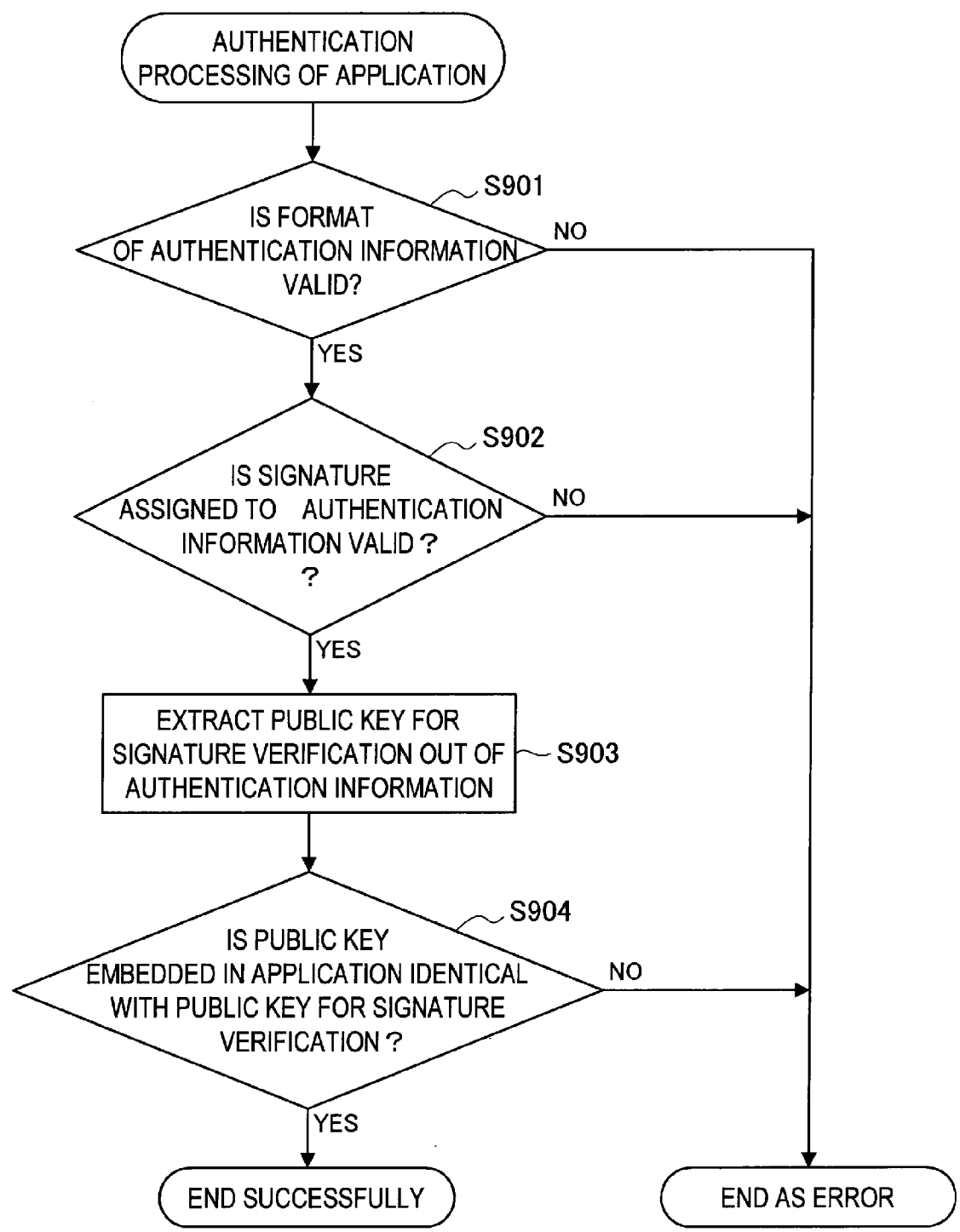
FIG. 16 is a flow chart showing an authentication processing of application executed in step S808 in FIG. 15.

FIG. 16 is a flow chart showing an authentication processing of application executed in step S808 in FIG. 15.

In FIG. 16, first, the control module 620 determines whether there is validity in a format of the received authentication information 412 (step S901). Specifically, the control module 620 determines whether the format of the authentication information 412 is same as a format, like the one illustrated in FIG. 18, defined in the step S215 in FIG. 14 when the authentication information 412 was generated by the issuer server 200.

If the format of the authentication information 412 is valid (YES in step S901), the control module 620 verifies the signature data 415 included in the authentication information 412 using the public key embedded in step S202 in FIG. 14. The control module 620 determines whether the signature data 415 is valid or not (step S902). Specifically, the control module 620 decrypts the signature data 415 using the public key embedded in step S202, determines whether the decrypted data is identical to the target data for the signature, that are the application identifier 413 and the public key for signature verification 414, and determines whether the signature data 415 is valid or not.

If the format of the authentication information 412 is not valid (NO in step S901) or if the signature data 415 is not valid (NO in step S902), the control module 620 determines that the authentication information 412 is not valid, and ends this processing as an error.

If the signature data 415 is valid (YES in step 902), the control module 620 extracts the public key for signature verification 414 out of the received authentication information 412 (step S903).

Next, the control module 620 determines whether the public key for signature verification 414 extracted from the authentication information 412 is identical to the public key 618 received in step S807 in FIG. 15 (step S904).

If the public key for signature verification 414 is identical to the public key 618 (YES in step S904), the control module 620 determines that the application 610 is valid and ends this processing successfully. If the public key for signature verification 414 is not identical to the public key 618 (NO in step S904), the control module 620 determines that the application 610 is not valid and ends this processing as an error.

According to the authentication processing of application in FIG. 16, if the public key for signature verification 414 extracted from the authentication information 412 is not identical to the public key 618 received in step S807 in FIG. 15, that is if an invalid application (not shown) obtains the access right information (not shown), the processing is to be ended as an error. This prohibits the invalid application (not shown) which obtains the access right information (not shown) from accessing to the secure chip 630.

In the foregoing authentication processing of application in FIG. 16, if a secured communication path is prepared in advance between the client 600 and the authentication server 410, there is no target likely to be altered in the authentication information 412, so it is not necessarily need to authenticate validity of the authentication information 412. In other words, in the authentication processing of application in FIG. 16, the processing of step S903 is executed at first without executing the processing of step S901 and step S902. This decreases the number of steps in the authentication processing of application.

As described above, according to the processing of the access control in FIG. 15, executing a processing same as the foregoing authentication processing of access right information in FIG. 6, a processing same as the authentication processing of application in FIG. 16 and a processing same as the foregoing control processing of command execution in FIG. 8 achieves the same effect as the foregoing processing of access control in FIG. 5. Further, in the authentication processing of application in step S808, the processing speed of the authentication processing of application can be improved because the application 610 can be authenticated only by the comparison between the public key for signature verification 414 and the public key 618.

The purpose of the present application can be also achieved in a case where a storage medium storing program codes for software, that is to achieve the functions of each of the foregoing embodiments, are provided to the system or the device, and where a computer (or a CPU, MPU, etc.,) of the system or the device reads and executes the program codes stored in the storage medium.

In this case, the program codes read out of the storage medium are by itself to achieve the functions of each of the foregoing embodiment, and the program codes and the storage medium storing the program codes are to constitute the present invention.

The storage medium for providing the program codes is, for example, an optical disk, a magnetic tape, a non-volatile memory card or a ROM, such as a floppy (registered trademark) disk, a hard disk, a magnet-optical disk, CD-ROM, CD-R, CD-RW, DVD-ROM, DVD-RAM, DVD-RW or DVD+RW. The program codes may also be downloaded via network.

Further, the functions of each foregoing embodiment can be realized not only by executing the program codes read out by the computer, but also in a case where an OS (operating system) or the like running onto a computer performs all or a part of the actual processing based on the instructions of the program codes.

Further, the functions of each foregoing embodiment can also be realized in a case where the program codes read out of the storage medium is written onto a memory included in a function enhancement board inserted into a computer or a memory included in a function enhancement unit connected to a computer, then based on the instructions of the program cords, a CPU or the like included in the function enhancement board and the function enhancement unit performs all or a part of the enhancement functions.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing apparatus comprising:
a processor; and
a memory device storing instructions which when executed by the processor, causes the processor to:
receive a request for access to an IC chip from an application that is stored on the information processing apparatus, the request for access including access right information for accessing the IC chip, wherein the access right information includes information used for acquiring authentication information;
acquire the authentication information for authenticating the application from an external server based on the access right information contained in the request for access;
authenticate the application based on the authentication information; and
control an access of the application to the IC chip based on an authentication result.

2. The information processing apparatus according to claim 1, wherein the instructions further cause the processor to:
store a first public key of a key pair having a first secret key and the first public key,
wherein the access right information contains a first digital signature using the first secret key of the first key pair,
wherein the authentication information contains a second digital signature using the first secret key of the first key pair, and
verify the first digital signature contained in the access right information, and verifies the second digital signature contained in the authentication information.

3. The information processing apparatus according to claim 1, wherein the instructions further cause the processor to:
obtain binary data of the application from the application,
wherein the authentication information contains a signature value of the application using a second secret key of a second key pair that has the second secret key and a second public key, and the second public key of the second key pair, and
authenticate the application by comparing the binary data of the application, and a decrypted data that is the signature value of the application contained in the authentication information decrypted using the second public key of the second key pair contained in the authentication information.

4. The information processing apparatus according to claim 1,
wherein the application has a third public key of a third key pair having a third secret key and the third public key, and a third digital signature using the third secret key of the third key pair,
wherein the instructions further cause the processor to:
obtain the third public key of the third key pair from the application,
wherein the authentication information contains the third public key of the third key pair, and
authenticate the application by comparing the third public key of the third key pair, and the third public key of the third key pair contained in the authentication information.

5. The information processing apparatus according to claim 1, further comprising:

a storage unit that stores command information for access to the IC chip, which is included in the access right information contained by the application that has been authenticated, wherein the instructions further cause the processor to:

permit the application to access to the IC chip when a command for access to the IC chip from the application is contained in the command information for access, which is stored in the storage unit, and prevent the application from accessing to the IC chip when the command for access to the IC chip from the application is not contained in the command information for access, which is stored in the storage unit.

6. The information processing apparatus according to claim 5, wherein the storage unit further stores accessible area information of the IC chip, which is included in the access right information contained by the application that has been authenticated, and wherein the instructions further cause the processor to:

restrict an accessible area of the IC chip to be accessed by the application based on the accessible area information stored in the storage unit.

7. The information processing apparatus according to claim 1, wherein the instructions further cause the processor to:

retain the authentication information obtained by the acquisition unit, and authenticate the application based on the authentication information that is retained.

8. The information processing apparatus according to claim 1, wherein the authentication information received from the external server includes an application identifier, an application signature value, a public key, and a signature data.

9. The information processing apparatus according to claim 1, wherein the instructions further cause the processor to:

transmit an authentication request to the external server in response to receiving the request for access to the IC chip from the application, wherein the authentication request includes the access right information and requests the authentication information corresponding to the access right information.

10. The information processing apparatus according to claim 1, wherein the information processing apparatus acquires the authentication information from the external server via a network.

11. A non-transitory computer readable storage medium storing a program that causes a computer to function as:

a reception unit that receives a request for access to an IC chip from an application that is stored on the information processing apparatus, the request for access including an access right information for accessing the IC chip, wherein the access right information includes information used for acquiring authentication information;

an acquisition unit that acquires the authentication information for authenticating the application from an external server based on the access right information contained in the request for access received by the reception unit;

an authentication unit that authenticates the application based on the authentication information obtained by the acquisition unit; and a control unit that controls an access of the application to the IC chip based on an authentication result by the authentication unit.

12. An information processing system comprising:

an information processing apparatus; and an external server that is capable of communication with the information processing apparatus, wherein the information processing apparatus including:

a reception unit that receives a request for access to an IC chip from an application that is stored on the information processing apparatus, the request for access including access right information for accessing the IC chip, wherein the access right information includes information used for acquiring authentication information;

an acquisition unit that acquires the authentication information for authenticating the application from the external server based on the access right information contained in the request for access received by the reception unit;

an authentication unit that authenticates the application based on the authentication information obtained by the acquisition unit; and a control unit that controls an access of the application to the IC chip based on an authentication result by the authentication unit.

* * * * *